United States Patent
Yao et al.

(10) Patent No.: US 7,865,775 B2
(45) Date of Patent: Jan. 4, 2011

(54) REMOTE FIRMWARE RECOVERY

(75) Inventors: Jiewen Yao, Shanghai (CN); Vincent J. Zimmer, Federal Way, WA (US); Kunye Zhu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 12/056,925

(22) Filed: Mar. 27, 2008

(65) Prior Publication Data

US 2009/0249120 A1 Oct. 1, 2009

(51) Int. Cl.
*G06F 11/00* (2006.01)
(52) U.S. Cl. .................. 714/36; 713/1; 713/2
(58) Field of Classification Search .......... 714/36; 713/1, 2
See application file for complete search history.

(56) References Cited

U.S. PATENT DOCUMENTS

| 6,763,301 | B2 * | 7/2004 | McDonough | 701/208 |
| 7,207,039 | B2 | 4/2007 | Komarla et al. | |
| 7,299,354 | B2 | 11/2007 | Khanna et al. | |
| 7,702,896 | B1 * | 4/2010 | Polyudov | 713/2 |
| 2007/0169088 | A1 * | 7/2007 | Lambert et al. | 717/168 |

* cited by examiner

*Primary Examiner*—Robert Beausoliel
*Assistant Examiner*—Charles Ehne
(74) *Attorney, Agent, or Firm*—Schwabe, Williamson & Wyatt, P.C.

(57) ABSTRACT

Embodiments of the present invention provide methods, systems, and apparatus for instantiating, by a computing system, a firmware recovery module in response to a detected firmware failure during a system startup. The firmware recovery module establishes access to a remotely disposed recovery server and retrieves from it a replacement or update firmware to address the firmware failure.

18 Claims, 3 Drawing Sheets

REMOTE FIRMWARE RECOVERY

TECHNICAL FIELD

Embodiments of the present invention relate to the field of computer science. In particular to remotely accessing update or replacement firmware images upon firmware failure.

BACKGROUND

When computing system firmware becomes corrupted due to a hardware error or other reason, the firmware must be replaced or updated manually. This is typically done through locally-attached devices such as a Universal Serial Bus (USB) drive, floppy disk drive, optical disk drive, or other internal or external peripheral device. This can be problematic if the device does not have a locally-attached drive, the media containing the update or replacement firmware image is not physically available, or if a knowledgeable user is not present to perform the install.

BRIEF DESCRIPTION OF THE DRAWINGS

Embodiments will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS

Figure 1:
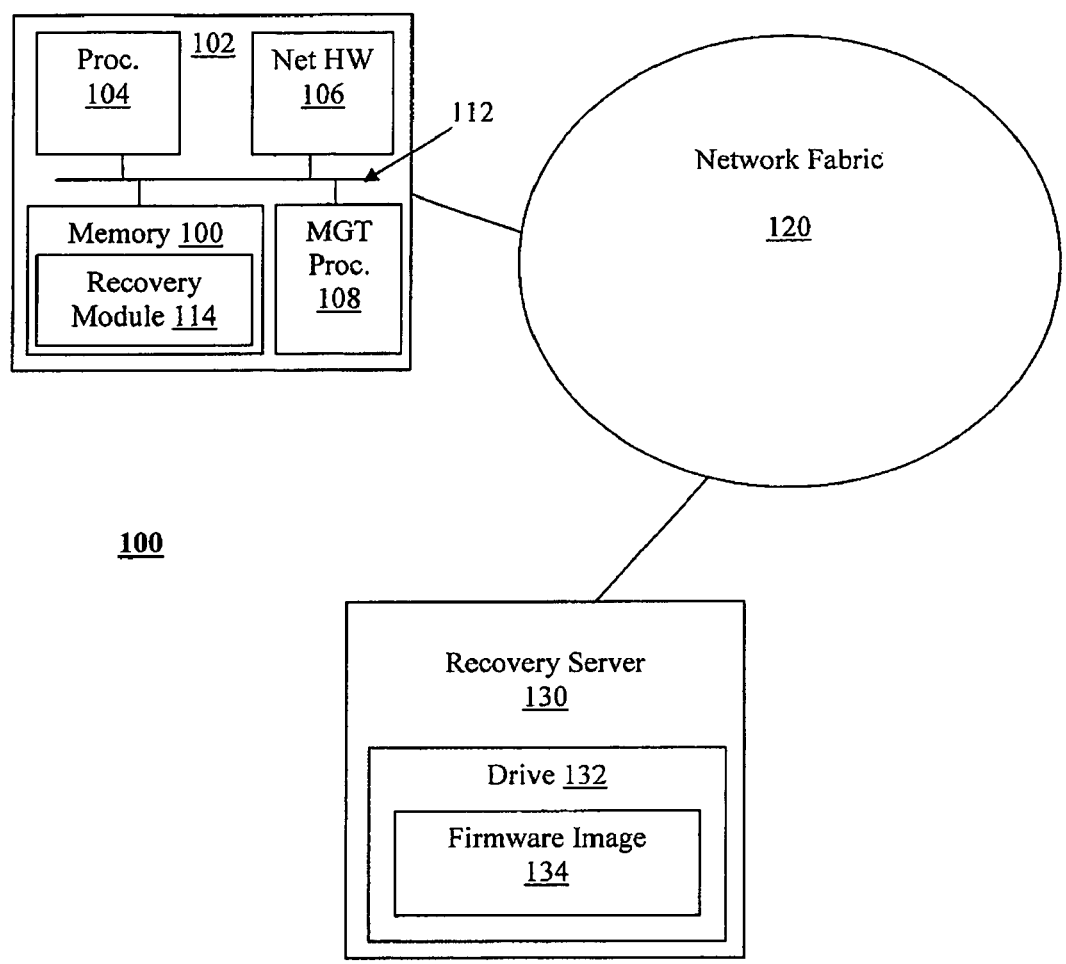
FIG. 1 illustrates an overview of a remote firmware recovery system in accordance with various embodiments.

In the following detailed description, reference is made to the accompanying drawings which form a part hereof, and in which embodiments are shown by way of illustration. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

The description may use perspective-based descriptions such as up/down, back/front, and top/bottom. Such descriptions are merely used to facilitate the discussion and are not intended to restrict the application of embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments, are synonymous.

In various embodiments, methods, apparatuses, and systems for remote firmware recovery are provided. In exemplary embodiments, a computing system may be endowed with one or more components of the disclosed apparatuses and/or systems and may be employed to perform one or more methods as disclosed herein.

In embodiments, a firmware recovery module may be instantiated by a computing system in response to a firmware failure. The firmware recovery module may establish a network connection to a remotely-disposed firmware recovery server and retrieve an updated or replacement firmware module to address the firmware failure. In embodiments, the firmware recovery module may be stored in a fault-tolerant boot-block and may be instantiated by loading it into a memory of the computing system. In embodiments, the firmware recovery module may load a network driver to establish a network connection to the remotely-disposed firmware recovery server to download and install the firmware. In embodiments, a user may need to enter a username and/or a password, a Universal Resource Locator (URL), or other locator to access the firmware recovery server. In embodiments, a wireless connection may be used to connect to the recovery server. In embodiments, a portion of the fault-tolerant boot-block may have a startup or boot module configured to begin the startup process (e.g. bootstrap the computing system) upon powering on the computing system and to detect a firmware failure and to instantiate the firmware recovery module in response to detecting the firmware failure. In embodiments, the firmware recovery module may be part of the startup or boot module.

In embodiments, a Preboot execution Environment (PXE) module may be utilized to download the replacement or update firmware. In embodiments, the firmware recovery module may be configured to load an Internet Small Computing System Interface (iSCSI) driver to map a firmware recovery drive of the recovery server as an accessible drive of the computing system. Embodiments may be configured to utilize a security mechanism, such as Internet Protocol Security (IPSec) or other security protocol or protocol suite, to secure and authenticate the network connection. Embodiments may be configured to utilize an Out-of-Band Controller of the computing system to download the replacement or update firmware. In embodiments, the Out-of-Band Controller may be configured to be run by a management processor of the computing system, the management processor separate and distinct from a primary processor of the computing system. In embodiments, the Out-of-Band Controller may be configured to map a recovery drive of the firmware recovery server as an accessible drive of the computing system. In embodiments, the Out-of-Band controller may be configured to utilize Serial Over LAN (SOL) to establish a connection to the recovery server. In embodiments, it may be configured to utilize Integrated Drive Electronics Redirect (IDER) to map the recovery drive. Such an Out-of-Band Controller may be, in embodiments, an Active Management Technology (AMT) firmware running on a Management Engine (ME) processor, different from the primary processor of the computing system.

In embodiments, the firmware recovery module or other module may be configured to download and install the update or replacement firmware to address the firmware failure. In embodiments, the firmware recovery module may be configured to cause the computing system to restart after installation of the replacement or update firmware.

Platform Initialization (PI) modules as defined by the Unified Extensible Firmware Interface (UEFI) specification include a PI Pre EFI Initialization (PEI) recovery module with a small driver model that can meet the space constraints of a computing system's boot-block (e.g., 64 kbyte, 128 kbyte, or other). These modules have miniature versions of the UEFI drivers that are less sophisticated than the full UEFI drivers used by Operating Systems and various pre-boot applications. Embodiments may include a UEFI-compatible network driver, or repurposed UEFI driver, capable of fitting into a fault-tolerant boot-block and loadable by a firmware recovery module in the event of a firmware failure at startup. Storing a network recovery module and a network driver in a fault-tolerant boot block may reduce the probability that one or both may be corrupted in the event of a fault-condition affecting portions of the firmware not stored in the fault-tolerant boot-block. Embodiments may therefore increase the reliability of computing systems. In embodiments, the firmware recovery module may be a repurposed PI PEI recovery module. In embodiments, it may be distinct from the PI PEI recovery module, but may nonetheless be UEFI-compatible.

FIG. 1 illustrates an overview of a remote firmware recovery system 100 in accordance with various embodiments. Computing system 102 may include primary processor 104, network hardware 106, management processor 108, and memory 110. Some or all of these components may be connected by bus 112. Embodiments may include computing systems with more or fewer elements than are depicted in FIG. 1. As such, FIG. 1 is not meant to be read in a limiting way.

Memory 110 may include a fault-tolerant boot-block having firmware recovery module 114. Memory 110 may be, in embodiments, Read Only Memory (ROM), Non-volatile RAM (NVRAM), Flash memory, or other memory. Embodiments are not meant to be limited to any type or types of memory. In embodiments, memory 110 may be processor memory. In such embodiments, memory 110 may not be connected to processor 104 via bus 112. In embodiments, memory 110 may be on a motherboard of computing system 102. In embodiments, memory 110 may be an internal or external memory component. Memory 110 may include a Basic Input/Output System (BIOS) or other firmware module.

In embodiments, computing system 102 may be configured to detect a firmware failure during a system startup and instantiate firmware recovery module 114 in response. In embodiments, firmware recovery module 114 may be configured to establish a network connection across network fabric 120 using a network hardware device (not shown) to remotely-disposed recovery server 130. Remotely-disposed recovery server 130 may have recovery drive 132 including replacement or update firmware 134. In embodiments, firmware recovery module 114 may be configured to map recovery drive 132 as an accessible network drive of computing system 102. In embodiments, firmware recovery module 114 may be configured to download and install replacement or update firmware 134 upon establishing the network connection and/or mapping recovery drive 132 as an accessible remote network drive. In embodiments, firmware recovery module 114 may be configured to utilize PXE to download replacement or recovery firmware module 134. In embodiments, it may be configured to utilize iSCSI to map recovery drive 132.

In embodiments, firmware recovery module 114 may be configured to utilize an Out-of-Band Controller configured to run on management processor 108 to map recovery drive 132 and/or establish a connection to recovery server 130. In embodiments, management processor 108 may be a Management Engine (ME) and the Out-of-Band Controller may be an AMT firmware configured to run on the ME. This may, in embodiments, provide enhancements to AMT.

In embodiments, computing system 102 may be a desktop computer, laptop computer, mobile computing device, network server, thin client, or other computing device configured to utilize firmware. In embodiments, the firmware may be legacy BIOS, Unified Extensible Firmware Interface (UEFI) compatible, Extensible Firmware Interface (EFI) compatible, or other firmware. In embodiments where firmware recovery module 114 is UEFI-compatible, it may be a repurposed PE PEI recovery module. In such embodiments, it may include a UEFI-compatible network hardware driver or drivers sized appropriately to fit into a fault-tolerant boot-block of memory 110.

Figure 2:
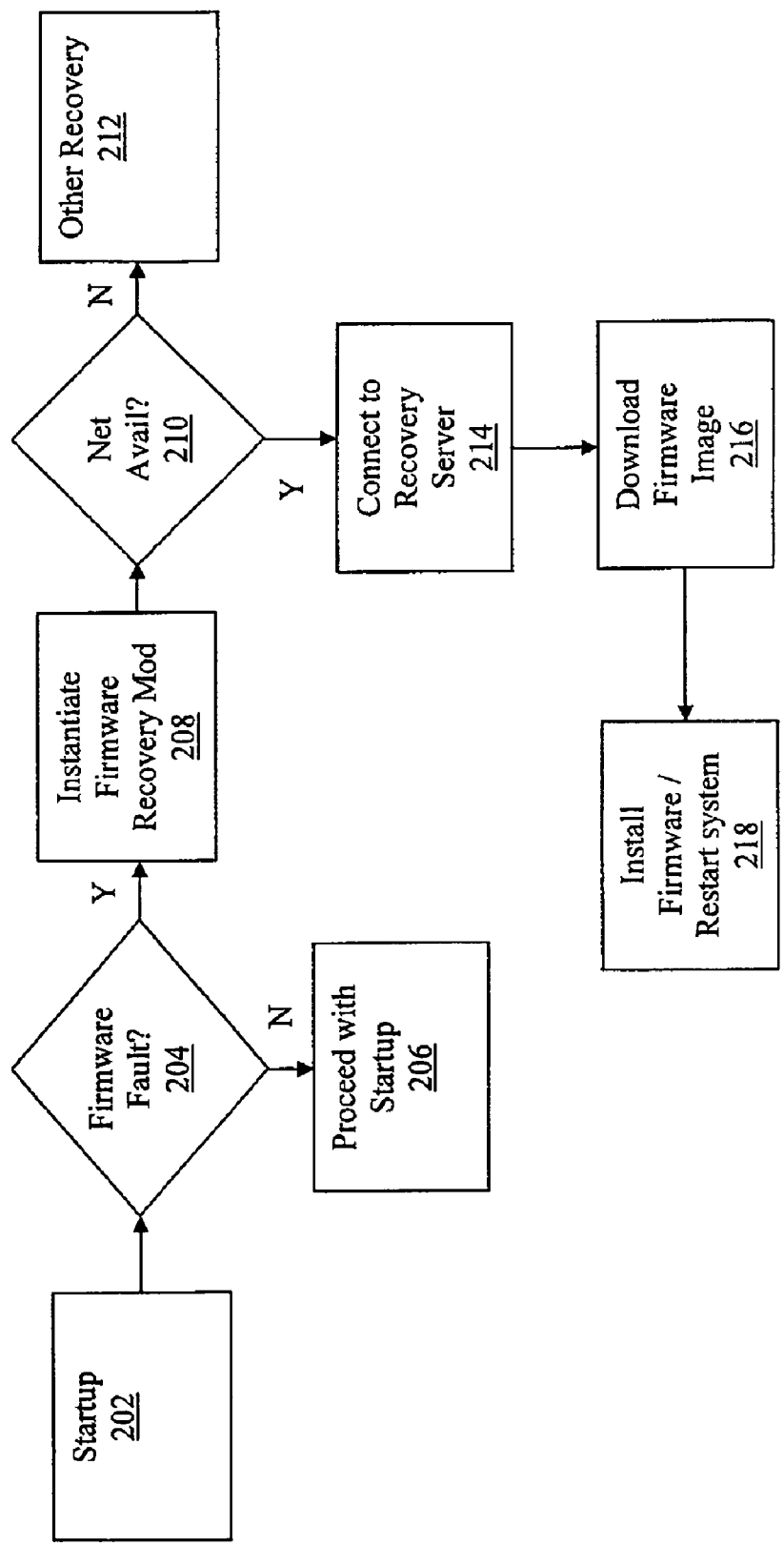
FIG. 2 illustrates a flow chart for firmware recovery in accordance with various embodiments.

FIG. 2 illustrates a flow chart for remote firmware recovery in accordance with various embodiments. The process may begin at system startup 202. The computing system may detect a firmware failure 204. In embodiments, this may involve detecting a recovery boot mode state. If there is no firmware failure, then the computing system may proceed with the system startup 206 including loading an operating system and/or other applications. If a firmware failure is detected, a firmware recovery module may be instantiated 208. The firmware recovery module may determine whether there is an available network connection 210. If not, an other recovery method may be attempted 212 such as loading a replacement or update firmware using a directly-connected drive such as a hard drive, flash card, optical disk drive, or other—either internal or external—peripheral. If a network connection is available, the firmware recovery module may establish a connection to a firmware recovery server 214 and download replacement or updated firmware 216. In embodiments, establishing a network connection may involve loading a network hardware driver such as a wireless or wired network hardware driver configured to operate a network hardware device of the computing system. In some embodiments, system firmware may detect recovery prior to running memory initialization code. In those embodiments, the recovery activity and drivers may run using the processor cache-as-RAM and download an updated memory initialization module as part of the firmware update. The firmware recovery module may then install the replacement or updated firmware 218 and possibly restart the computing system.

Various Network Application Layer protocols may be utilized in embodiments. Options may include Hypertext Transfer Protocol (HTTP), iSCSI, Preboot eXecution Environment (PXE) client/server protocol, File Transfer Protocol, or other protocols including standards-based, proprietary, and/or vendor-specific protocols. Various Network Physical Layer protocols may be utilized in embodiments. Options may include wired and wireless network protocols such as, for example, IEEE 802.11a, IEEE 802.11b, and IEEE 802.11g compliant network protocols, including those that are Wi-Fi compatible. (IEEE=Institute of Electrical and Electronic Engineers; see e.g. IEEE 802-11g, published Jun. 27, 2003 for further information.) Other options may include wide-area cellular telephone network protocols such as those defined by 3G (Third Generation) standards, a Personal Area Network (PAN), or other. Embodiments are not limited to any type or types of wired or wireless networks.

In embodiments, the firmware recovery module may be configured to prompt a user of the computing system to provide a username and/or a password to obtain access to the remotely-disposed firmware recovery server or to download or install the replacement or update firmware. In embodiments, public-key encryption may be utilized to authenticate the user and/or computing system, secure the connection between the computing system and the firmware recovery server, and/or validate that the replacement or update firmware is from a trusted source. In embodiments, a user interface of the computing system may indicate whether the replacement or update firmware has a valid signature or is otherwise from a trusted source and provide an opportunity for the user to accept/reject or cancel the download and/or install. In other embodiments, a remote administrator may be able to authorize the download and/or install.

In embodiments, a user of the computing system may input a Uniform Resource Locator (URL) or other locator to access the firmware recovery server. In embodiments, a display of the computing system may display a progress of the download and/or install of the replacement or update firmware.

In embodiments, the firmware recovery module may be configured to provide diagnostic information to the remotely-disposed recovery server to provide enhanced manageability to the recovery server. In embodiments, this feature may enhance an existing management solution, such as AMT or other.

Figure 3:
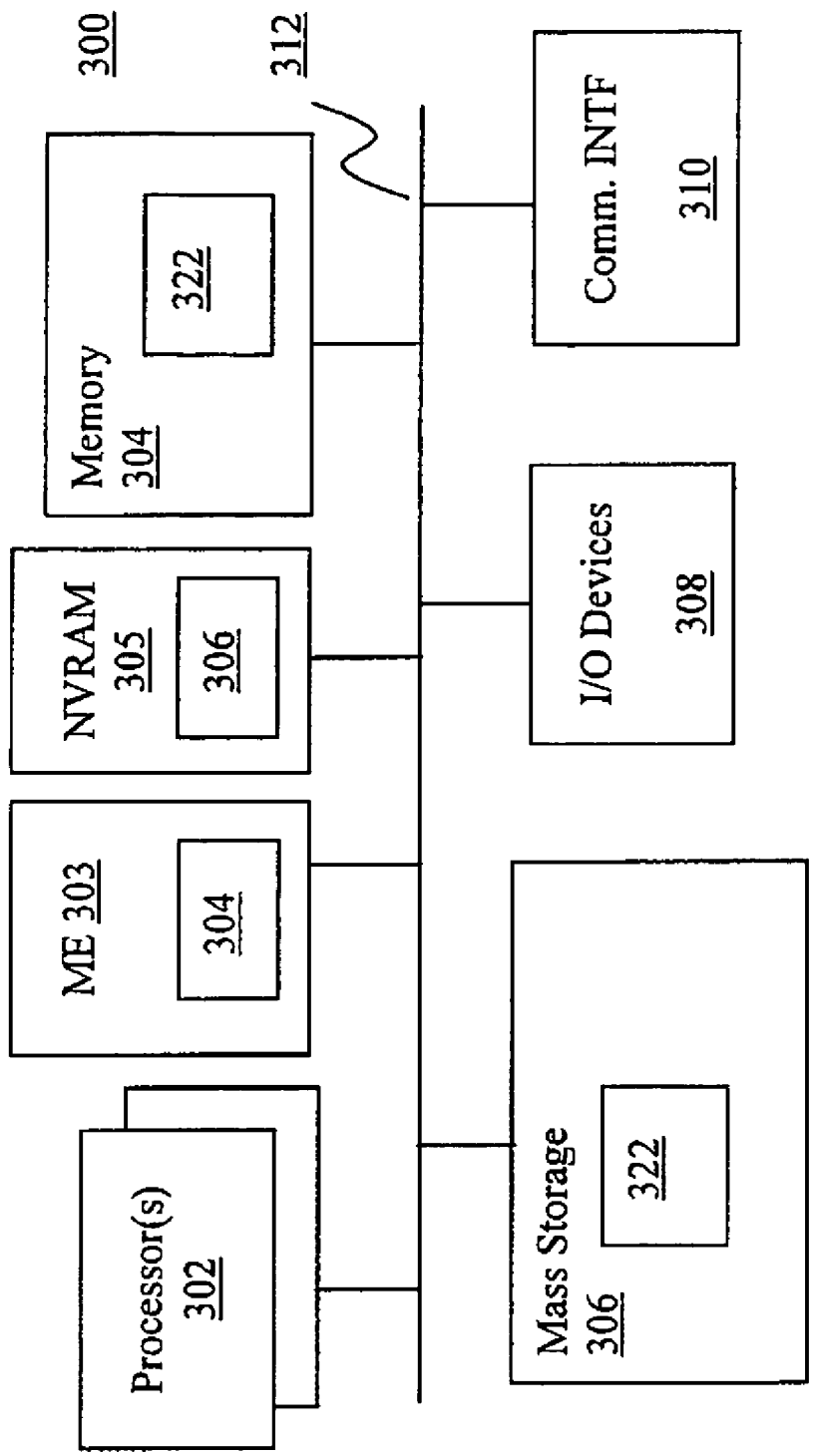
FIG. 3 illustrates a computing system suitable for practicing various embodiments of the present invention.

FIG. 3 illustrates an example computer system suitable for use to practice various embodiments of the present invention. As shown, computing system 300 includes one or more processors 302, manageability engine 303, non-volatile memory (NVRAM) 305 and system memory 304. Additionally, computing system 300 includes mass storage devices 306 (such as diskette, hard drive, CDROM and so forth), input/output devices 308 (such as keyboard, cursor control and so forth) and communication interfaces 310 (such as network interface cards, modems and so forth). The elements are coupled to each other via system bus 312, which represents one or more buses. In the case of multiple buses, they may be bridged by one or more bus bridges (not shown).

Each of these elements may perform its conventional functions known in the art. In particular, NVRAM 305 may comprise firmware recovery module 320 in accordance with various embodiments. Firmware recovery module 320 may be placed into NVRAM 305 in the factory, or in the field, through, for example, a distribution medium (not shown), such as a compact disc (CD), Digital Versatile Disc (DVD), or through communication interface 310 (from a distribution server (not shown)). In embodiments, the distribution medium may be an article of manufacture having programming instructions configured to implement one or more aspects of one or more methods as disclosed herein. More specifically, the article of manufacture may comprise a computer readable storage medium having a plurality of programming instructions stored in the storage medium. The programming instructions may then be read or loaded into a computer system to practice or contribute to the practice of the methods described herein to implement remote firmware recovery.

In various embodiments, computer system 300 may be a server, a desktop computer, a laptop computer, a tablet computer or a smart phone. In other embodiments, computer system 300 may also be embedded in a media player, a game console, a set-top box, diskless workstation, or a digital recorder.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of embodiments of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   instantiating, by a management processor of a computing system, a firmware recovery module stored in a fault-tolerant boot-block of the computer system, in response to a detected firmware failure during a system startup, wherein
   the firmware recovery module includes a wireless network driver operatively coupled to a controller capable of communicating with a remotely disposed recovery server via an out-of-band (OOB) channel,
   the management processor is separate and distinct from a primary processor of the computing system,
   the controller is managed by the management processor, and
   the wireless network driver sized to fit in the boot-block;
   establishing, by the wireless network driver of the firmware recovery module and the controller, a wireless network connection with the remotely disposed recovery server via the OOB channel; and
   retrieving from the recovery server, by the firmware recovery module, replacement or update firmware to address the firmware failure.

2. The method of claim 1, wherein the instantiating comprises loading the firmware recovery module from the fault-tolerant boot-block into memory of the computer system.

3. The method of claim 2 wherein the loading comprises loading an Internet Small Computer System Interface (iSCSI) driver and the establishing includes mapping a firmware recovery drive of the recovery server as an accessible drive to the computing system, the iSCSI driver being part of the firmware recovery module installed in the boot-block of the computer system.

4. The method of claim 1 wherein the out-of-band controller is configured to map a recovery drive of the recovery server as an accessible drive to the computing system.

5. The method of claim 4 wherein the establishing comprises establishing a Serial Over LAN (SOL) session with the recovery server and mapping the recovery drive using Integrated Drive Electronics Redirect.

6. The method of claim 1 further comprising providing, by the firmware recovery module, diagnostic information to the recovery server.

7. The method of claim 1 further comprising retrieving and installing a replacement firmware image on the computing system, and restarting the computing system.

8. An article of manufacture comprising:
a tangible non-transitory computer-accessible medium; and
a plurality of programming instructions stored on the computer-accessible medium and designed to program computer system to enable the computer system to:
store a firmware recovery module in a fault-tolerant boot-block of the computer system, the firmware recovery module including a wireless network driver operatively coupled to a controller of the computer system, the controller being capable of communicating with a remotely disposed recovery server via an out-of-band (OOB) channel, the wireless network driver being sized to fit in the boot-block, and the controller being managed by a management processor of the computer system that is separate and distinct from a primary processor of the computer system,
instantiate, using the management processor, the firmware recovery module, in response to a detected firmware failure during a system startup;
establish, using the wireless network driver and the controller, a wireless network connection access to a remotely disposed recovery server via the OOB channel, the controller managed by the management processor; and
retrieve from the recovery server replacement or update firmware to address the firmware failure.

9. The article of claim 8 wherein to instantiate the firmware recovery module by loading further comprises to load the firmware recovery module from the fault-tolerant boot-block.

10. The article of claim 8 wherein the plurality of programming instructions are further designed to program the computer system to load the wireless network driver of the firmware recovery module to operate the controller to establish the wireless network connection to the remotely disposed recovery server.

11. The article of claim 10 wherein the firmware recovery module further includes an Internet Small Computer System Interface (iSCSI) driver and the firmware recovery module is configured to program the computer system to utilize the iSCSI driver to map a firmware recovery drive of the recovery server as an accessible drive to the computer system, the iSCSI driver being part of the firmware recovery module installed in the boot-block of the computer system.

12. The article of claim 8 wherein the plurality of programming instructions are configured to program the computer system to utilize the controller to map a firmware recovery drive of the recovery server as an accessible drive to the computer system.

13. The article of claim 8 wherein the plurality of programming instructions are further designed to program the computer system to retrieve and install a replacement firmware image on the computer system, and restart the computer system.

14. A system comprising:
a primary processor;
a management processor coupled to the primary processor;
an out-of-band (OOB) controller coupled to the management processor; and
a fault tolerant boot-block coupled to the management processor and having stored therein a firmware recovery module, the firmware recovery module having a wireless network driver properly sized to fit in the boot-block, and the firmware recovery module configured to be instantiated by the management processor upon a detected firmware failure during a startup operation of the system, establish by the wireless network driver a wireless network connection to a remotely disposed recovery server via the OOB controller, and retrieve from the recovery server replacement or updated firmware to address the firmware failure.

15. The system of claim 14 wherein the fault tolerant boot-block further comprises an Internet Small Computer System Interface (iSCSI) driver and the firmware recovery module is further configured to load the iSCSI driver to operate the network hardware device of the computing system, iSCSI driver being part of the firmware recovery module installed in the boot-block of the computer system.

16. The system of claim 14 wherein the management processor is further configured to map a recovery drive of the recovery server as an accessible drive to the computing system to access the replacement or updated firmware.

17. The system of claim 14 wherein the out-of-band controller is configured to initiate a Serial Over LAN (SOL) session with the recovery server and map the recovery drive using Integrated Drive Electronics Redirect.

18. The system of claim 14 wherein the firmware recovery module is further configured to retrieve and install a replacement firmware image on the system, and restart the system.

* * * * *

UNITED STATES PATENT AND TRADEMARK OFFICE
CERTIFICATE OF CORRECTION

PATENT NO. : 7,865,775 B2
APPLICATION NO. : 12/056925
DATED : January 4, 2011
INVENTOR(S) : Jiewen Yao et al.

Page 1 of 1

It is certified that error appears in the above-identified patent and that said Letters Patent is hereby corrected as shown below:

Column 7, line 22, "connection access to a" should read -- connection to a --
Column 7, line 29, "recovery module by loading further comprises" should read -- recovery module further comprises --

Signed and Sealed this
Twenty-second Day of February, 2011

David J. Kappos
*Director of the United States Patent and Trademark Office*